March 30, 1937. H. R. ARF Re. 20,318
SYSTEM FOR AIR CONDITIONING RAILROAD CARS
Original Filed Nov. 29, 1929
Fig. 1.
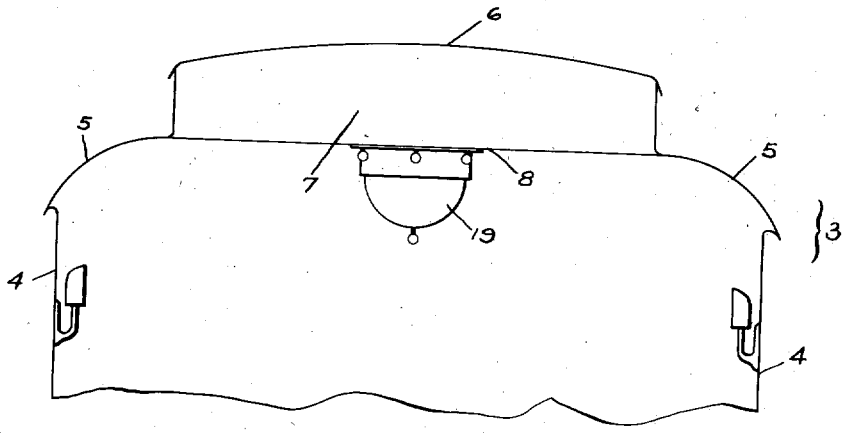
Fig. 2.
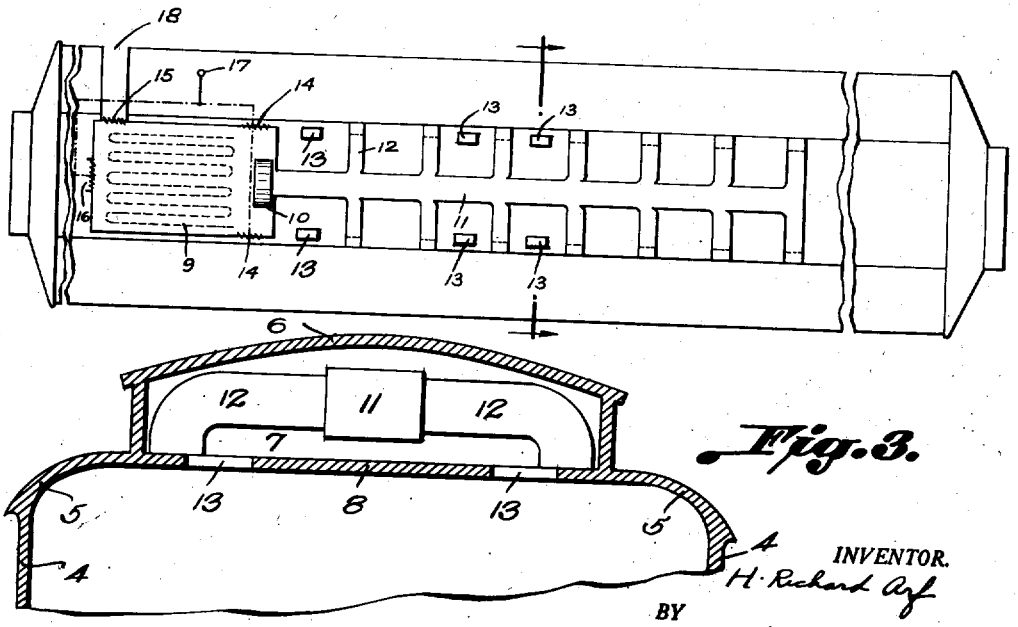
Fig. 3.
INVENTOR.
H. Richard Arf
BY
Herman Seid
ATTORNEYS.

Reissued Mar. 30, 1937 Re. 20,318

UNITED STATES PATENT OFFICE 20,318

SYSTEM FOR AIR CONDITIONING RAILROAD CARS

Herman Richard Arf, Louisville, Ky., assignor, by mesne assignments, to Carrier Corporation, Newark, N. J., a corporation of Delaware Original No. 2,005,769, dated June 25, 1935, Serial No. 410,360, November 29, 1929. Reissue No. 20,178, dated November 24, 1936, Serial No. 83,820, June 5, 1936. This application for reissue January 26, 1937, Serial No. 122,414

11 Claims. (Cl. 98—14)

This invention relates to methods of and means for air conditioning railroad cars especially of the passenger type.

The general object of the invention is to utilize to a maximum that area within the railroad car not devoted to passenger sealing accommodation, for the installation of air conditioning equipment and efficient distribution of treated air within the car. Since it is desirable to preserve the interior appearance of the car and its usual facilities, applicant plans to use as little of the floor space as possible. The space beneath the car can be used to a limited degree, but for many purposes cannot obviously be availed of. Furthermore, the proper functioning of an air conditioning system often requires a plenum space of relatively large area suitable for positioning of equipment as well as routing different currents of air.

Applicant, therefore, makes provision for a plenum chamber within the car.

A feature of the invention, accordingly, resides in the incorporation of a plenum space within the car by employing a double ceiling, the upper ceiling constituting the top of the car and the inner one spanning the usual crowned portions. Since the space between the top of the car and the crowned portions or shoulders is in the nature of a monitor arrangement used mainly for ventilating purposes, its use as a plenum space does not detract from the maximum utility of the interior car area, due to the space now serving to improve air conditions in a more efficient and desirable manner.

Another feature of the invention covers the use of a continuous ceiling line across the car instead of the arrangement in which an upper monitor space is provided. This makes for ease and economy in construction as well as for improved appearance.

A further feature resides in the use of a plenum area for the accommodation of air conditioning apparatus, and as a return duct.

Other objects and features of the invention making for efficiency in operation of a car air conditioning system, maximum utility of car space and minimum cost in installation and operation of a car system, will be more apparent from the following detailed description of one form of the invention to be read in connection with the accompanying drawing in which—

Fig. 1 is a diagrammatic fragmentary view of a car equipped with a plenum space in accordance with applicant's design;

Fig. 2 is a plan view of a car equipped with a system installed in combination with applicant's car plenum structure; and Fig. 3 is a sectional view of the car taken on line 3—3 of Fig. 2.

Considering the drawing similar designations referring to similar parts, numeral 3 refers to a railroad car of conventional design having sides 4, crowned portions 5 and top 6. The space between the upper extremities of portions 5 and the top of the car is usually in the form of a monitor used for ventilating purposes. As is customary, ventilators or windows are provided along the sides of the monitor and may be opened or shut in order to provide ventilation. Applicant, however, spans the upper extremities with a ceiling 8. This, in effect, provides an unbroken surface including the inner sides of crowned portions 5 and the ceiling 8. The area between ceiling 8 and top 6 is therefore constituted as a plenum space. The term "plenum space" is defined as being a relatively large area, or chamber, within which air is collected at a pressure which differs from the pressure of air surrounding the chamber. Since this area is ordinarily not used except for ventilation purposes, its use as a plenum space does not detract from the maximum utility of the car. In fact, it adds to the utility of the car in that it serves a more useful purpose in the conditioning of a car, as employed in applicant's system, than in forming the usual monitor arrangement.

As shown in Fig. 2, the plenum space may be used for the accommodation of equipment as well as for distribution and routing of air. Thus, in the arrangement shown, which is merely illustrative, air conditioning coils 9 are positioned within the plenum space at one end of the car. The coils may be served by a unit conditioner or other suitable means positioned within or under the car in any suitable manner. Fan 10 discharges the air into a main distributing duct 11. Outlets 12 lead from the main distributing duct to a plurality of points within the car from which the air is discharged in any desirable manner. By utilizing the interior of the plenum space for the accommodation of distributing ducts and of the conditioning apparatus, the appearance of the car is preserved and no conspicuous added structure employed in the system. The plenum space itself may be provided with inlets 13 for intaking return air. While the inlets 13 are shown positioned along the edges of the false ceiling, it is evident that they may be placed at any desired points, either lengthwise, or crosswise of the false ceiling, to secure withdrawal of air from the car to the apparatus in the most advantageous manner. The return air could then be routed through the coils or around the coils in any desired arrangment. In Fig. 2 there are provided recirculating openings 14, fresh air opening 15 and return opening 16. All said openings may be suitably equipped with dampers, which may be manually controlled or automatically operated. Thermostat 17 is shown positioned in the car and arranged to regulate the return air and recirculating air dampers.

Thus, in the operation of the system fresh air could be intaken through window or opening 18 leading to damper 15, in accordance with the number of people accommodated within the car or depending upon outside conditions of temperature and humidity. Return air could be routed directly from the car or from the plenum space to damper 16 or the recirculating dampers 14. The thermostat could be arranged so that as the temperature within the car rose, more air would be intaken through 16 and less through 14. As the temperature fell, reverse operation would take place. No control is shown on the refrigeration affecting the coils, but any suitable means and controls could be provided. It is obvious also that steam or heated air could be used in the coils under winter operating conditions and that conditioned air or water could be used under summer operating conditions.

Under all conditions of operation, all the apparatus for conditioning and distributing the air is effectively concealed from view and accommodated in a plenum space which utilizes to a maximum an area otherwise of comparatively little value in the car.

The undersurface of the plenum chamber not only serves as the ceiling of the car, but may be used for mounting lighting fixtures 19 and for other suitable purposes.

While applicant shows a typical arrangement for utilizing a plenum space laid out in accordance with his design, it would be understood that any arrangement in which the upper area of a railroad car is segregated and used as a plenum space for similar purposes is considered within the purview of the invention.

Having described my invention what I claim as new and desire to secure by Letters Patent is:—

1. In an air conditioning system for a railroad car having a monitor top, a false ceiling and crowned shoulder portions, a plenum space extending substantially the length of the car, said plenum space being formed between said false ceiling and the roof of said car, said false ceiling extending across the car from one crowned shoulder to the other, air conditioning apparatus, a conduit wholly within said plenum space for supplying conditioned air from said apparatus to a plurality of air outlets in said false ceiling, the remainder of said plenum space serving as a passageway for returning air from the car to said conditioning apparatus.

2. In combination with a railroad car having a false ceiling, air conditioning means, an inlet for supplying outdoor air to said means, a plenum space in the upper part of said car formed between said false ceiling and the roof of said car, a conduit within said plenum space, wholly surrounded by the air in said plenum space, for distributing air from said conditioning means to the occupied portion of said car, the remainder of said plenum space serving as a passageway for returning air from the occupied portion of the car to said conditioning means and in a course around said means.

3. In an air conditioning system for a railroad car, a confining wall, a plenum space formed between the roof of the car and said confining wall, air conditioning means located within said plenum space, an inlet for supplying outdoor air to said means, a portion of said plenum space serving as a passageway for returning air from the car to said means and in a course bypassing said means, and a conduit within said plenum space for conveying conditioned air from said means to a plurality of points within said car.

4. In an air conditioning system for a railroad car, having a monitor top and crowned shoulder portions, a confining wall, a plenum space extending substantially the length of the car, said plenum space being formed between the roof of the car and said confining wall serving as the ceiling of the car, said confining wall extending across the car from one crowned shoulder to the other, air conditioning means located in said plenum space, means within said plenum space for conveying conditioned air from said conditioning means to a plurality of points within said car, the remainder of said plenum space constituting a passageway for returning air from a plurality of points within said car to said conditioning means.

5. In combination with a railroad car having a monitor top and crowned shoulder portions, a false ceiling extending across the car from one crowned shoulder to the other, a plenum space in the upper part of the car formed between the roof of the monitor and said false ceiling, air conditioning means in said plenum space, a conduit located wholly within said plenum space for distributing conditioned air from said means to the occupied portion of said car, the remainder of said plenum space serving as a passageway for returning air from the occupied portion of the car to said conditioning means.

6. In an air conditioning system for a railroad car having a monitor top and crowned shoulder portions, a false ceiling extending from one crowned shoulder to the other to form with the top of the car a plenum space, air conditioning apparatus, means forming passages in said plenum space communicating with said apparatus, means for supplying conditioned air from said apparatus to the car through one of said passages and for returning air from the car to said apparatus through another of said passages.

7. In an air conditioning system for a railroad car having a monitor top and crowned shoulder portions, a false ceiling forming with the top of the car a plenum space extending lengthwise of the car, air conditioning apparatus, a conduit within said plenum space connected to said apparatus for supplying conditioned air from said apparatus to a plurality of air outlets in said false ceiling, and means for returning through at least a portion of the remainder of said plenum space air from the car to said conditioning apparatus.

8. In combination with a railroad car, air conditioning means, a confining wall, an outdoor air inlet connected to said air conditioning means, said confining wall being positioned in the upper part of said car to form with the roof of said car a plenum space, a conduit within said plenum space, at least a portion of the remainder of said plenum space serving as an air passageway, and means for circulating air through said car, said air conditioning apparatus, said conduit, and said plenum space.

9. In an air conditioning system for a railroad car, a false ceiling forming with the roof of the car a plenum space, air conditioning means, means for supplying outdoor air to said car, at least a portion of said plenum space comprising a passageway providing communication between said air conditioning means and the portion of the car adapted to be occupied, a conduit within said plenum space connecting said air conditioning means to said portion of the car, and means for circulating air through said air conditioning means, said conduit, said portion of the car, and said portion of said plenum space.

10. In an air conditioning system for a railroad car having a monitor top, a false ceiling extending across the monitor top and forming with said top a plenum space extending lengthwise of the car between the roof of the car and said false ceiling, air conditioning means, means associated with said air conditioning means for delivering to the car through the space between said roof and said false ceiling air conditioned by said conditioning means, and for returning to the conditioning means through the space between said roof and said false ceiling air from the car.

11. In combination with a railroad car having a monitor top and crowned shoulder portions, a false ceiling extending across the car from one crowned shoulder to the other to form with said top a plenum space in the upper part of the car, air conditioning means, a conduit located within said plenum space connecting said air conditioning means to the portion of the car adapted to be conditioned, and means for returning air from said portion of the car through at least a portion of the remainder of said plenum space to said air conditioning means.

HERMAN RICHARD ARF.